Figure 1:
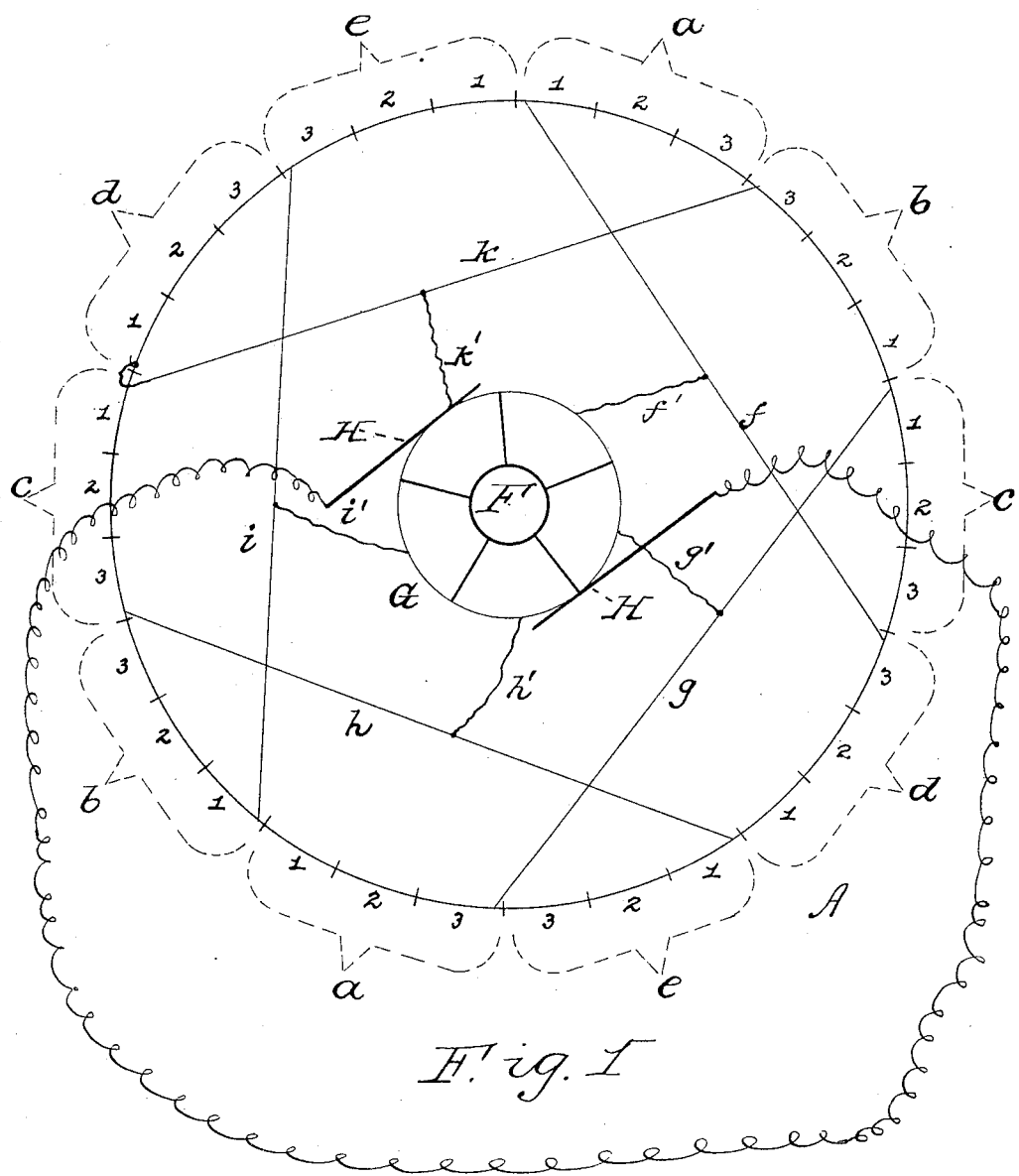

(No Model.) 4 Sheets—Sheet 1.

C. R. ARNOLD.
ARMATURE WINDING FOR DYNAMO ELECTRIC MACHINES.

No. 464,547. Patented Dec. 8, 1891.

WITNESSES:

INVENTOR,
Craig R. Arnold
By S. J. Van Stavoren
ATTORNEY (No Model.) 4 Sheets—Sheet 2.

C. R. ARNOLD.
ARMATURE WINDING FOR DYNAMO ELECTRIC MACHINES.

No. 464,547. Patented Dec. 8, 1891.

WITNESSES: INVENTOR,
Craig R. Arnold
By S. J. Van Stavoren
ATTORNEY (No Model.) 4 Sheets—Sheet 3.

C. R. ARNOLD.
ARMATURE WINDING FOR DYNAMO ELECTRIC MACHINES.

No. 464,547. Patented Dec. 8, 1891.

WITNESSES: INVENTOR,
Craig R. Arnold
By S. J. Van Stavoren
ATTORNEY

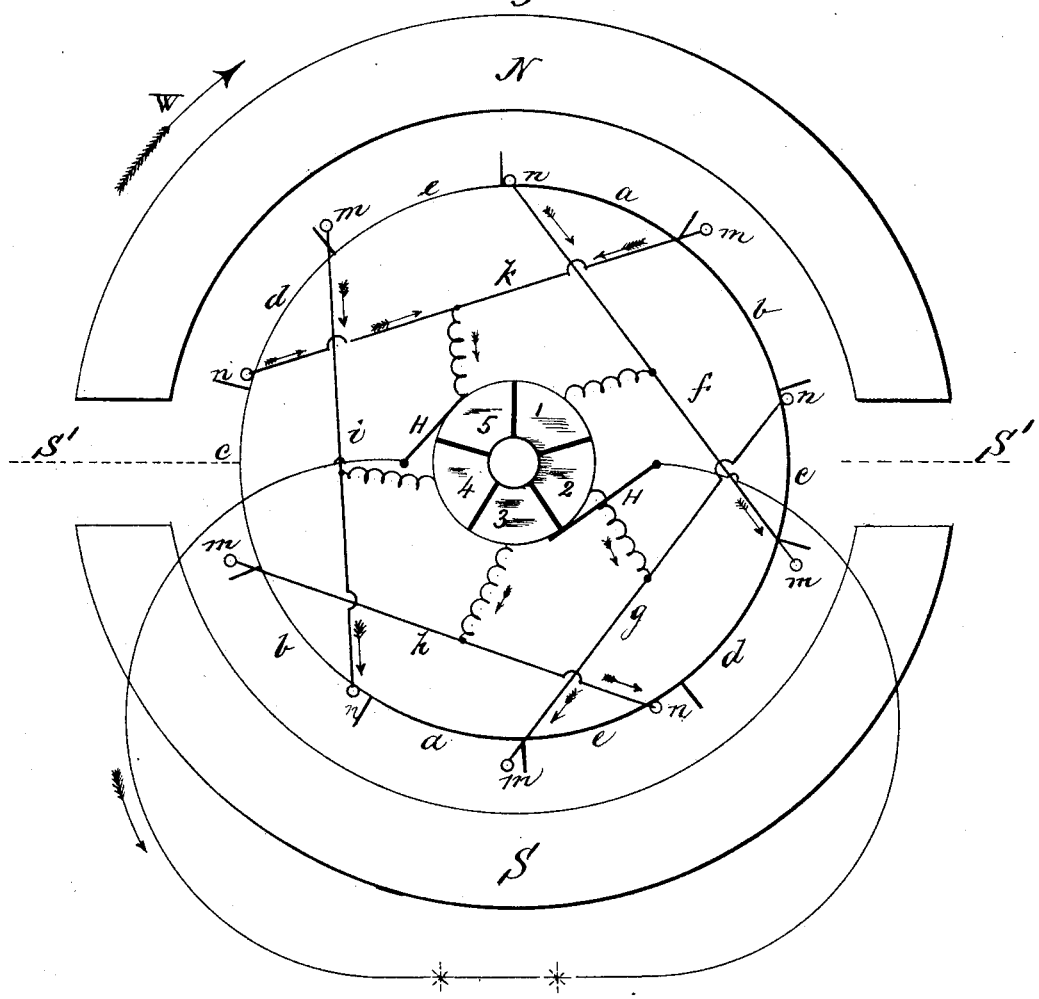

UNITED STATES PATENT OFFICE.

CRAIG R. ARNOLD, OF PHILADELPHIA, PENNSYLVANIA.

ARMATURE-WINDING FOR DYNAMO-ELECTRIC MACHINES.

SPECIFICATION forming part of Letters Patent No. 464,547, dated December 8, 1891.

Application filed March 14, 1885. Serial No. 158,821. (No model.)

*To all whom it may concern:*

Be it known that I, CRAIG R. ARNOLD, a citizen of the United States, residing at Philadelphia, in the county of Philadelphia and State of Pennsylvania, have invented certain new and useful Improvements in Armatures for Dynamo-Electric Machines and Motors, of which the following is a specification.

My invention relates to the manner of winding and applying the coils and connecting them to one another and to the commutator on an armature for a dynamo-electric machine or motor, and has relation especially to that form of armature known as the "cylinder-armature," in which the coils of wire are wound over the exterior of the armature structure and across its ends.

The object of my invention is, among other things, to avoid inequality in the length and resistance of the various armature-coils, due to the piling up of the coils at the end of the armature, where they in part overlie one another, as well as to secure other advantages.

My invention consists, first, in dividing each of the various armature coils or bobbins of an armature having three or more coils or bobbin-spaces into two or more sections or portions and in winding in proper succession a part only of the various coils or bobbins and then winding the remaining sections of the bobbins in reverse succession.

My invention consists, further, in dividing each bobbin in three parts or sections lying beside one another and in winding two of the sections of all the coils first and then winding the remaining sections, taking the bobbin-spaces in reverse order.

My invention consists, secondly, in winding the two or more sections or portions of a divided coil or bobbin beside one another and in parallel planes intersecting the armature. Heretofore in the art where the coil on a cylindrical armature has been wound in two or more sections lying beside one another on the periphery of the armature the said two or more sections have been made to cross one another on the end of the armature, thus causing the outer coil to be longer and of greater resistance than the other.

In my invention the two sections are wound in substantially parallel or non-intersecting planes, the lines or plane of division between which planes is a plane transverse to the armature, thus avoiding the tendency to variations of resistance and securing other advantages in construction and operation.

My invention consists, further, in the dispositions and combinations of coils and coil-sections herein described, and more particularly specified in the claims.

Figure 2:
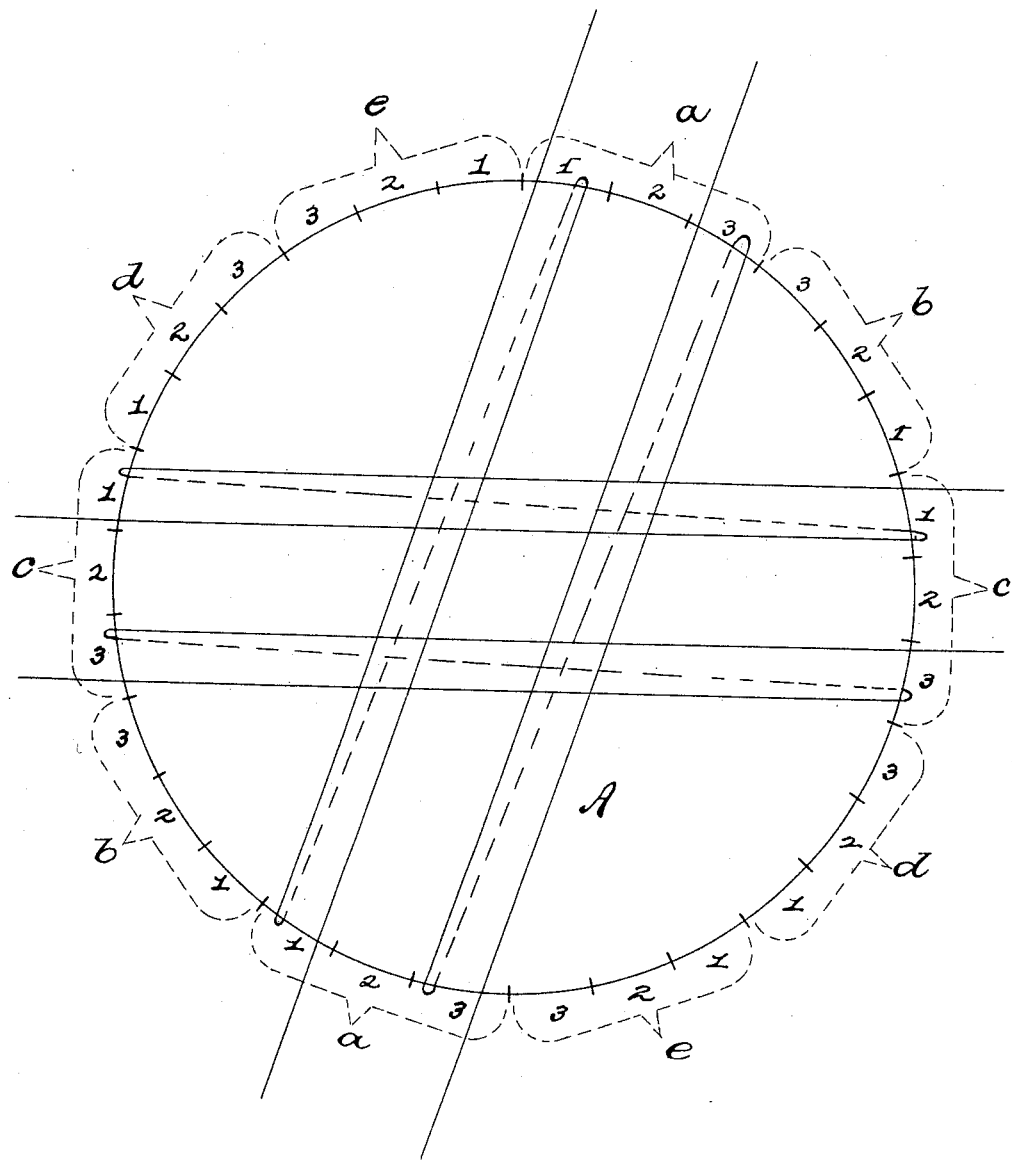
Figure 3:
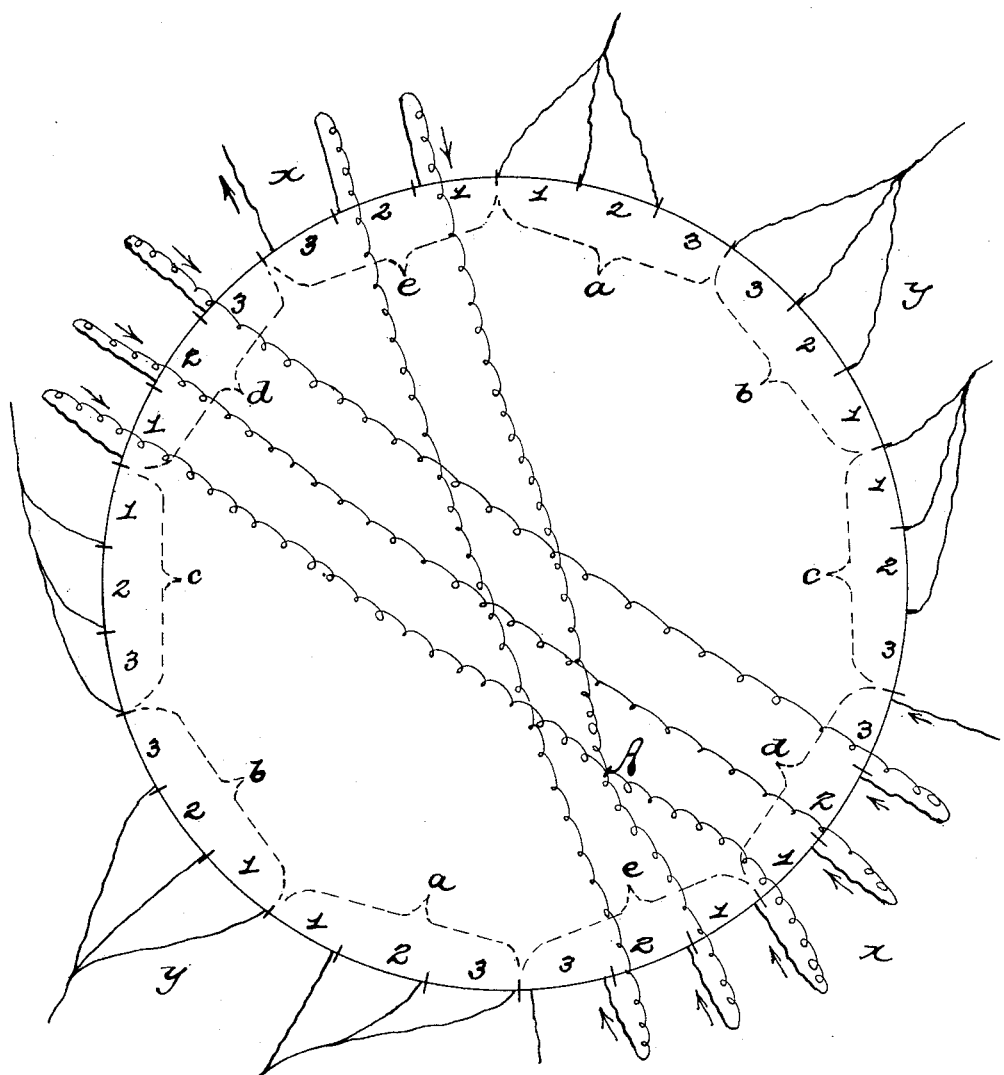

In the accompanying drawings, Figure 1 is a diagram illustrating the division of the armature coils or bobbins into sections and the connection of the bobbins to one another and to the commutator. Fig. 2 illustrates the manner in which the sections or portions of the bobbin are wound. Fig. 3 illustrates some of the ways in which the various sections or portions of the same coil or bobbin space may be connected to one another. Fig. 4 is a simplified diagram showing the manner of connecting the various bobbins to one another and to the commutator, so as to make a closed-circuit cylindrical armature.

I have illustrated my invention as applied to an armature in which five bobbin-spaces are employed. Such bobbin-spaces are herein indicated by the letters *a a b b c c d d e e*. In the present instance I have preferred to divide the bobbin or coil filling each of said spaces into three sections or portions 1 2 3, as illustrated in Fig. 1.

A indicates the cylindrical armature; H H, the commutator-brushes; F, the armature-shaft, and G the commutator-segments, numbered 1 2 3 4 5 in Fig. 4. The sections or portions 1 2 3 of each bobbin or coil are disposed beside one another, and instead of being made to cross one another at the ends of the armature are applied so that the planes of the sections shall be non-intersecting or substantially parallel planes, as shown in Fig. 2, thereby overcoming the objection incident to the piling up of one section upon the other at the end of the armature.

In winding the various sections of the various coils I first apply or wind the outer coils 1 3 of all the bobbins before winding the middle sections 2. Thus, for instance, beginning with bobbin *a*, I wind the outer sections 1 3, leaving the section 2 unwound or open, and then proceed to fill the spaces 1 3 of bobbin *c*, leaving its middle section 2 unwound or open. After this I wind the two outer sections for the bobbins $e$ and $b$ in the order named, and then proceeding to armature space or bobbin $d$ wind its sections 1 and 3, and immediately after fill the section 2, or, if desired, section 2 might be wound first, inasmuch as this is the last section and no difference would be made in the length of its various sections no matter in what order they are wound, since the sections are formed parallel to one another at the end of the armature, as already explained. After filling section $d$ 1 I proceed to fill the sections 2 of the coils $b\ e\ c\ a$ in the order named—that is to say, in the reverse order to that in which the sections 1 3 of the said several bobbins were applied.

It is obvious that as the winding proceeds from the beginning of the operation the coils and sections of the various armature-spaces become longer as they build up upon one another where they cross at the end of the armature. Consequently the sections of coil $a$ will be composed of two of the shortest sections 1 3 and one of the longest sections 2, the latter section being that last wound upon the armature.

In the remaining bobbins, taking them in the order in which the sections 1 3 were applied, the sections 1 3 will be successively longer than sections 1 3 of bobbin $a$, while their sections 2 will be successively of less length than the section 2 of bobbin $a$, the result being that the mean of the lengths or resistances for the sections of any one bobbin-space will be substantially the same as that of the other spaces. All the coils or sections being filled or wound, the various sections of any one bobbin or coil may be connected in any of the ways known in the art—that is to say, they may be connected in series, as indicated at spaces $d\ e$, Fig. 3, two free ends being left for connection to other bobbins or to the commutator, or they may be coupled in multiple arc—that is to say, the same ends of the three sections may be connected together, as indicated at spaces $a\ b\ c$, leaving as in the former case two free ends for each armature coil or bobbin.

Assuming that the bobbins are all wound in the same manner, each may be considered as having an inner and an outer end, which in Fig. 4 are represented, respectively, at the points $m\ n$. The manner of connecting the outer and inner ends of the said coils to one another and to the commutator to make a symmetrical closed-circuit armature is as follows: Starting with bobbin $a$, whose inner end is connected to commutator-segment 1, the outer end $m$ of said bobbin is connected to the inner end of $c$, connection being made at the same time to the block 2 of the commutator.

In the old form of winding the Siemens armature the outer end of $a$ would be connected to the inner end of the coil in the next armature-space $b$; but in the present case, as will be observed, I skip an armature-space. In the same manner, proceeding always in the direction of the revolution indicated by the arrow W, the outer end of $c$ is connected to the inner end of $e$, skipping the space $d$, and connection made at the same time to the next section 3 of the commutator. The outer end of $e$ is then connected to the inner end of $b$, skipping armature-space $a$, and connection taken to block 4 of the commutator. The outer end of $b$ is now connected to the inner end of $d$, skipping space $c$, and connection made to the block 5, and finally the outer end of $d$ is connected to the inner end of $a$, skipping space $e$, thus completing the circuit of the armature, connection being made at the same time to the block 1 of the commutator.

As will be seen all of the armature-spaces have been taken into the circuit and at the same time a complete circuit of the commutator-cylinder has been made.

With a different number of bobbins a larger or smaller number of bobbin-spaces might be skipped in connecting the coils successively to one another.

Assuming that the armature revolves in the field-space between two pole-pieces N S and that the bobbin-terminals change their polarity on the line S′ S′, it is obvious that two brushes H H applied as shown would take off the current generated in the coils and would be respectively positive and negative. In other words, all the bobbin-terminals above the line S′ S′ may be considered as positive and all below said line as negative, excepting in those cases where a bobbin at any time is exactly on the line S′ S′, when it would be obviously neutral. The direction of the currents in the position of the parts shown in the drawings is indicated by the arrows.

Under the conditions supposed the bobbin $c$ is neutral. The circuit starting from lower brush H will branch, one branch starting from commutator-segment 2, including bobbins $a$ and $d$, from which latter connection is made to the segment 5 and the opposite brush. The other branch, starting from segment 3, will include the bobbins $e$ and $b$, connection from the latter being made to the same segment 5 through the connection between the inner end of $d$ and the outer end of $b$. Under the condition shown, although a connection from 2 exists through the coil $c$ to the inner end of $e$, no current will pass through $c$, but it will be short-circuited, and the various bobbins will be in succession thrown out at this point as they revolve to the neutral position. As the armature moves on from the position shown, connection from segment 3 will be broken and bobbin $c$ will become active, the circuit to the opposite brush being in such case through two branches from segment 2 to segment 5, one of which includes bobbins $a$ and $d$, while the other includes bobbins $c\ e\ b$. The circuits under various other conditions of the parts may be readily followed if it be assumed that all those coil-terminals above line S′ S′ are of one polarity and all below said line are of the opposite polarity at any stage of revolution.

The brushes II II are simply typical of any commutator-brushes, and they might be made, as is obvious, to include any desired spaces on the circumference of the armature. They also might be turned to different positions on the circumference thereof and, if desired, might be placed on a line at right angles to the line S' S'.

What I claim as my invention is—

1. In a dynamo-electric machine or motor, a cylindrical armature having its armature coils or bobbins divided into sections, the separate sections of each coil being wound or disposed in parallel planes the dividing-line of which intersects the armature-body or carrier.

2. In a dynamo-electric machine or motor, a cylindrical armature having its armature coils or bobbins disposed in sections wound in parallel planes the line of division between which intersects the armature, said sections being connected in parallel or multiple arc to one another and the same commutator-segment.

3. A cylindrical armature having its coils wound in sections disposed in separate parallel planes divided from one another on a line intersecting the armature, the end portions of a section of one coil underlying and the end portion of another section of the same coil overlying an end portion for a section of other coils of the armature.

4. In a dynamo-electric machine or motor, a cylindrical armature having its armature coils or bobbins wound in separate sections, said sections being disposed in different parallel planes the line of division between which is a substantially diametrical line.

5. In a dynamo-electric machine or motor, a cylindrical armature having its armature coils or bobbins divided into sections which are wound or disposed in separate parallel planes, the line of division between which planes is transverse to the armature, the end portion of a section of said coil underlying and the end portion of another section of said coil overlying another coil or coil-section of the armature.

6. A cylindrical armature having its coils divided into parallel sections disposed in planes parallel to one another but intersecting the armature, and a connection from the end of one coil or bobbin to the beginning of a bobbin or coil removed from the first one or more coil or bobbin spaces.

7. A cylindrical armature having its coils wound in three sections, the end portions of the two sections of one coil underlying and the end portion of the intermediate section overlying the end portion of the sections for other coils, as and for the purpose described.

8. In a cylindrical armature, armature coils or bobbins, each divided into two or more sections, a part of which sections for all the bobbins are wound or applied in regular order or succession, while other parts or sections are wound or applied in reverse order for the purpose of obtaining substantially the same mean length in the combined sections of the various bobbins.

9. In a dynamo-electric machine, an armature-coil divided into parts or sections, the end portion of one section lying above and the end portion of another section lying below another coil of the armature, and said sections being wound separately in planes which are parallel to each other but divided by a line transverse to the armature core or body.

In testimony whereof I affix my signature in presence of two witnesses.

CRAIG R. ARNOLD.

Witnesses:
S. J. VAN STAVOREN,
CHAS. F. VAN HORN.